US009060131B2

(12) United States Patent
Foster (10) Patent No.: US 9,060,131 B2
(45) Date of Patent: Jun. 16, 2015

(54) CONVERGENCE FEEDBACK INDICATOR, PROVIDED WHEN TAKING A PICTURE IN A CAMERA APPLICATION

(71) Applicant: BlackBerry Limited, Waterloo (CA)

(72) Inventor: Brett Foster, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/327,611

(22) Filed: Jul. 10, 2014

(65) Prior Publication Data

US 2014/0320732 A1 Oct. 30, 2014

Related U.S. Application Data

(62) Division of application No. 13/032,436, filed on Feb. 22, 2011, now Pat. No. 8,823,856.

(60) Provisional application No. 61/392,313, filed on Oct. 12, 2010.

(51) Int. Cl.
*H04N 5/232* (2006.01)
*H04N 5/225* (2006.01)

(52) U.S. Cl.
CPC ....... *H04N 5/23293* (2013.01); *H04N 5/23212* (2013.01)

(58) Field of Classification Search
CPC .............. G06F 3/005; H04N 1/00408; H04N 1/00416; H04N 1/2125; H04N 5/2356; G03B 3/00; G03B 3/02; G03B 3/04; G03B 3/06; G03B 3/10; G03B 13/32; G03B 13/34; G03B 13/36; G03B 13/18; G03B 13/20; G03B 13/22; G03B 13/24; G03B 13/26; G03B 13/28; G01C 3/32

USPC .................... 348/333.02, 345–356
See application file for complete search history.

(56) References Cited

U.S. PATENT DOCUMENTS

| | | |
|---|---|---|
| 2003/0160886 A1 | 8/2003 | Misawa et al. |
| 2004/0263629 A1 | 12/2004 | Ambiru et al. |
| 2008/0025715 A1 | 1/2008 | Ishii |
| 2008/0031611 A1 | 2/2008 | Konishi |
| 2008/0049137 A1 | 2/2008 | Endo |
| 2009/0059058 A1 | 3/2009 | Okabe et al. |
| 2009/0073305 A1 * | 3/2009 | Yuba et al. ............ 348/345 |
| 2009/0102960 A1 * | 4/2009 | Tsuchiya ............ 348/345 |
| 2010/0302434 A1 * | 12/2010 | Ohta ............ 348/345 |
| 2011/0019067 A1 * | 1/2011 | Matsumoto et al. ...... 348/346 |

FOREIGN PATENT DOCUMENTS

| | | |
|---|---|---|
| EP | 1531618 A1 | 5/2005 |
| JP | 2002-277727 A | 9/2002 |

OTHER PUBLICATIONS

USPTO, Response to Rule 312 Communication, U.S. Appl. No. 13/032,436, Aug. 6, 2014, 2 pgs.
CIPO, Office Action, Application No. 2,754,837, Oct. 30, 2013, 4 pgs.

* cited by examiner

*Primary Examiner* — Aung S Moe
(74) *Attorney, Agent, or Firm* — Fish & Richardson P.C.

(57) ABSTRACT

Apparatus and associated method for facilitating image capturing in an electronic camera without the image being completely focused. A "mostly-in-focus" indicator is provided to an operator of the camera to notify the operator that a reasonably good image is available for capture, without having to wait for the camera to finish a fine focus adjustment.

20 Claims, 5 Drawing Sheets

CONVERGENCE FEEDBACK INDICATOR, PROVIDED WHEN TAKING A PICTURE IN A CAMERA APPLICATION

CROSS-REFERENCE TO RELATED APPLICATION(S)

This patent application is a divisional application claiming the benefit of the following prior United States patent application entitled: "CONVERGENCE FEEDBACK INDICATOR, PROVIDED WHEN TAKING A PICTURE IN A CAMERA APPLICATION", application Ser. No. 13/032,436, filed on Feb. 22, 2011, pending, which in turn claims priority to U.S. Provisional Patent Application No. 61/392,313 entitled, "CONVERGENCE FEEDBACK INDICATOR, PROVIDED WHEN TAKING A PICTURE IN A CAMERA APPLICATION", filed on Oct. 12, 2010, the contents of each of which foregoing applications are incorporated herein by reference.

The present disclosure relates generally to a manner by which to facilitate photographic image recordation taken by a digital camera, such as those incorporated into wireless devices. More particularly, the present disclosure relates to an apparatus, and an associated method, by which an image that is "mostly-in-focus" can be captured by the camera device.

BACKGROUND

Recent years have witnessed the development and deployment of a wide range of electronic devices and systems that provide many new and previously-unavailable functions and services. Advancements in communication technologies, for instance, have permitted the development and deployment of a wide array of communication devices, equipment, and communication infrastructures. The development, deployment, and popular use of such devices, equipment, and communication infrastructures have, in significant aspects, changed the lives and daily habits of many.

Cellular, and other analogous, wireless communication systems, for instance, have been developed and deployed and have achieved significant levels of usage. Increasing technological capabilities along with decreasing equipment and operational costs have permitted, by way of such wireless communication systems, increased communication capabilities to be provided at lowered costs.

Early-generation, wireless communication systems generally provided for voice communications and limited data communications. Successor-generation communication systems have provided increasingly data-intensive communication capabilities and services. New-generation communication system, for instance, provide for the communication of large data files at high through-put rates. Communication, e.g., of large-size documents and other data files, is carried out, e.g., by attachment of the files to data messages, and then sending the data messages to which the files are attached.

In a cellular communication system, as well as an analogous communication system, the communications are typically effectuated through use of portable wireless devices, which are sometimes referred to as mobile stations. The wireless devices are typically of small dimensions, thereby to increase the likelihood that the device shall be hand-carried and available for use whenever needed as long as the wireless devices positioned within an area encompassed by a network of the cellular, or analogous, communication system. A wireless device includes transceiver circuitry to provide for radio communication, both to receive information and to send information. Wireless devices sometimes are provided with additional functionality. The additional functionality provided to a wireless device sometimes is communication related and other times, is related to other technologies, for instance, processing technologies. When so-configured, the wireless device forms a multi-functional device, having multiple functionalities. A camera functionality that provides for the capture and recordation of a photographic image or a series of images is amongst the functionalities that are sometimes provided to wireless devices. Because of the small dimensions of typical wireless devices, and the regular carriage of such devices by users, a wireless device having a camera functionality is available to the user to record an image or series of images, such as to form a video sequence of images, when so over the user elects to do so. The image, once recorded, saved, for example, at a storage element of the wireless device, can be transferred elsewhere. For instance, the recorded image defines a document file. And, the document file can be appended to a data message and sent elsewhere. The data file forming the image or images is also storable at the wireless device, available subsequently to be viewed at the wireless device.

Camera functionality provided to a wireless device typically includes a camera lens that functions to focus a subject and other structure to form and permit saving of a captured image. In more sophisticated implementations, the camera lens is movable to provide for a change in the focal point of a camera image. Various methodologies have been developed by which to facilitate focusing of the camera lens to improve recorded-image quality.

DETAILED DESCRIPTION

The present disclosure provides an apparatus, and an associated methodology, by which to facilitate photographic image recordation, such as a photograph taken by a wireless device having camera functionality.

Through operation of an implementation of the present disclosure, a manner is provided by which to provide a lens focus convergence indicator. The convergence indicator enunciates to a user of a camera, such as a camera incorporated into a wireless device, when the lens' focus-position of an auto-focus camera is such that a reasonably good image is available for capture. Stated another way, the convergence indicator informs a user that an image is sufficiently focused and ready for capture without having to wait for additional fine focusing.

In one aspect of the present disclosure, a lens assembly is provided. The lens assembly is comprised of an adjustable lens. The adjustable lens has a focal length, relative to a semiconductor image detector, which is electrically controllable and therefore electrically adjustable.

In another aspect of the present disclosure, image recording circuitry is provided, which is comprised of a semiconductor image detector. In one implementation, the semiconductor image detector is a CMOS (complementary metal oxide semiconductor) image detector. The CMOS image detector is configured to detect light that impinges on the CMOS image detector after passing through the adjustable lens. Light that impinges on the CMOS image detector generates electrical output signals that correspond to, i.e., represent, an image.

In another aspect of the present disclosure, signals representing an image on the image detector comprise indications of the clarity or focus of the image on the detector. Image clarity or focus can be determined by the examination of lines and edges. Lines and edges that are blurred, i.e., comprised of multiple adjacent pixels, indicate that the image is out of focus. An out-of-focus indication is detected by a processor associated with the camera, referred to herein as the camera ISP. Whether the image impinging on the detector is out of focus or in focus is represented by a focus parameter, which is generated by the camera ISP.

In another aspect of the present disclosure, a memory element is provided and configured to store focus parameter information such as lens position information.

In another aspect of the present disclosure, a focus controller is provided. The focus controller is configured to adjust the separation distance of an electrically-adjustable camera lens in the lens assembly. The separation distance corresponds to the focal length of the lens. The focal length of the lens is the distance between a focus of the curved surface of the camera lens to the image detector. The focus parameter identifies a value used in positioning of the camera lens in order to place an image in proper focus to record the image of the subject. The focus parameter is selected responsive to an indication of a determined characteristic of the subject.

In another aspect of the present disclosure, the focus parameter comprises a lens position of a movable lens of the camera functionality. The lens position is translatable over a range of positions to provide for focal point arrangement depending upon the subject whose image is to be recorded.

In another aspect of the present disclosure, the lens position is selected responsive to a determination of the clarity or definition of lines and edges of an image. An indication of this determination is used to select the lens position. Once the desired lens position is determined, the lens is caused to be translated to the appropriate position. The camera functionality, for instance, includes an electric motor, or other translator, that causes the appropriate translation to position the lens in the desired lens position. And, once the lens is suitably positioned, the image is recorded. The image, once recorded, is available for subsequent viewing.

In another aspect of the present disclosure, a quantitative determination is made of when the lens assembly is positioned in a mostly-in-focus position. First, the lens assembly is adjusted so that the image to b recorded is in focus. Indications of this lens position comprise a focus value. A threshold is then derived. The threshold is, e.g., a percentage of the focus, such as 75 percent of the focus value. For so long as the indicated focus value is above the threshold value, the image is considered to be mostly-in-focus. If, conversely, the focus value is subsequently determined to be less than the threshold, than the image is no longer considered to be mostly-in-focus.

In one implementation, the camera functionality is embodied at a wireless device, such as a cellular mobile station. The camera function is operable when the wireless device is used in a camera, or other recording, mode. When an image of a subject is to be recorded, a camera ISP determines whether the image is in-focus or out-of-focus. An indication of the determined focus state is used to select the lens position needed to define a correct focus point in order to form an in-focus image for recordation.

In one implementation, the adjustable lens and focus controller are configured to adjust the lens position relative to the image detector in quantized steps. A rapid, coarse adjustment of focus is achieved by relatively large, coarse adjustments of the lens position. Coarse adjustment is achieved by adjusting the lens position using relatively large incremental displacement steps. A slower, fine adjustment of focus is achieved by adjusting the lens position using relatively small incremental displacement steps. Coarse adjustment steps are used to rapidly bring an image into a relatively good focus whereas fine adjustment steps are used to achieve an optimal or "best possible" image focus.

Focus adjustment is performed by iteratively moving the lens and determining the definition or clarity of lines and edges after each lens position change. A coarse adjustment is performed first, i.e., when the camera functionality is invoked. During the coarse adjustment mode, the camera lens is moved in relatively large steps or increments. The definition or clarity of lines and edges is evaluated after each movement of the lens. Movement of the lens in a direction that improves focus continues until continued movement in the same direction starts to un-focus the image. The focus of an image on the image detector when the coarse adjustment concludes is reasonably well-focused but not maximally or optimally focused. Additional focus and an associated improvement in image quality can usually be obtained by performing a fine focus wherein the lens position is adjusted in small incremental steps to further improve line and edge clarity.

A fine focus adjustment mode is entered, wherein fine focus of the lens is performed by small, incremental position changes, after coarse adjustments are unable to make further improvement to the definition or clarity of lines and edges.

A recognizable photographic image exists on the image detector at the conclusion of the coarse adjustment. A recognizable image can therefore be captured without having to wait for the fine focus adjustment.

In these and other aspects, therefore, an apparatus, and an associated method, is provided for an electronic device. Electronic device is capable of recording a photographic image of a subject. A detector is configured to detect an indication of a determined characteristic of a subject. And, a focus controller is configured to select a focus parameter responsive to the indication of the determined characteristic of the detected subject.

Figure 1:
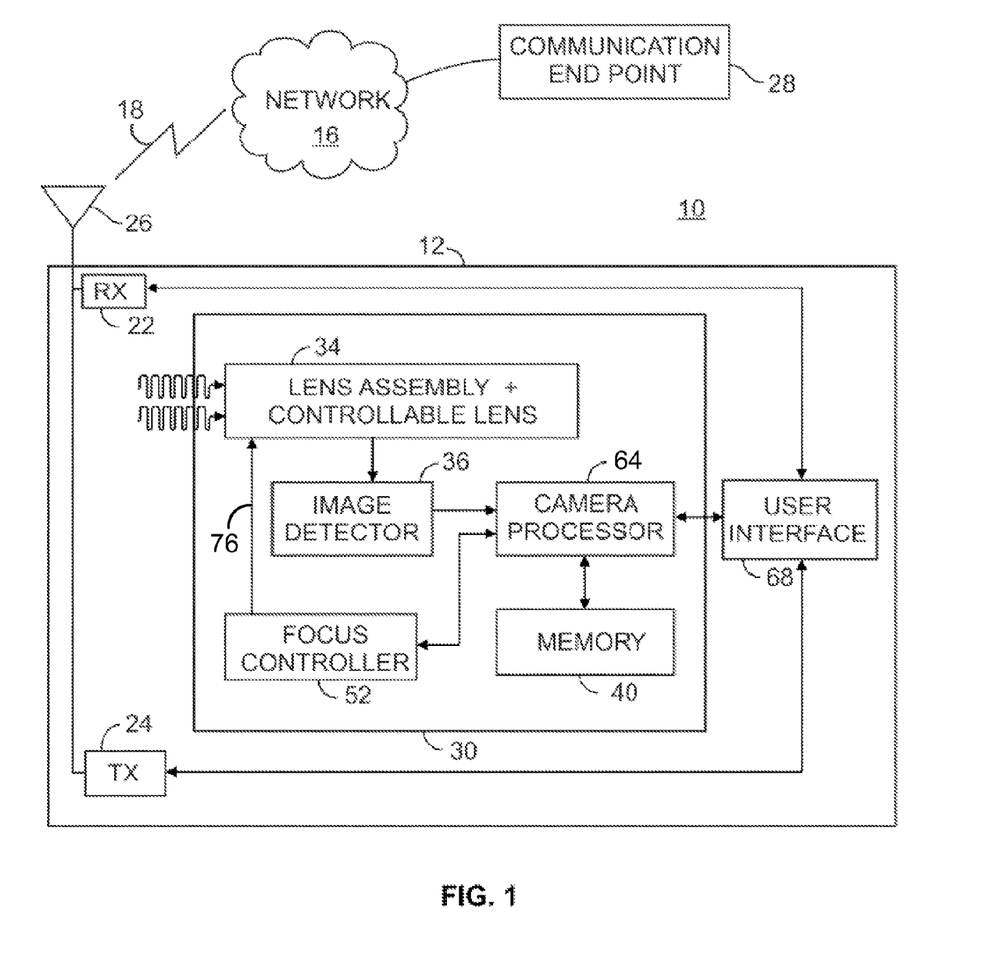
FIG. 1 illustrates a functional block diagram of a communication system having a wireless device, which includes an implementation of the present disclosure operable therein.

FIG. 1 illustrates a functional block diagram of a communications system 10. The system 10 is comprised of a portable wireless communications device 12, a wireless communications network 16, and a communication endpoint 28.

The wireless device 12 is comprised of a radio frequency receiver 22 and a radio frequency transmitter 24, the structure and operation of which are well known to those of ordinary skill in the art. An antenna 26, which is also well known, allows radio frequency signals 18 to be received by the receiver 22 and transmitted by the transmitter 24.

The wireless communications device 12 is provided a camera 30 that enables the device 12 to capture images for viewing on an associated display device of a user interface 68 or, transmit the images for additional processing or viewing by others. The camera 30 thus allows a user of the device 12 to take digital pictures and transmit data files that contain image information.

The camera 30 is comprised of a lens assembly 34, well known to those of ordinary skill in the art. The lens assembly 34 is comprised of a mechanically adjustable optical lens, not shown in FIG. 1 for clarity, but also well-known to those of ordinary skill in the art. Light that passes through the optical lens of the lens assembly 34 and impinges upon a semiconductor image recording device that comprises image recording circuitry forming an image detector 36. In one implementation, the image recording device is comprised of a CMOS image detector.

The clarity or definition of an image formed on the image detector after passing through the lens assembly 34 might not be well defined due to varying and unpredictable separation distances of the image detector from an object of interest to be captured, i.e., photographed. An image to be captured can be focused, i.e., its edges and lines be made clearer and more well-defined, by changing the position of an optical lens within the lens assembly 34.

The position or spacing of the optical lens away from the image recording device is effectuated electrically by a focus controller 52 and an electrically adjustable lens within the lens assembly 34. When an image on the image recording device is detected to be out of focus by a camera processor 64, signals provided to the focus controller 52 from the camera processor 64 causes the adjustable lens to move to improve image sharpness. Signals 76 provided to the lens assembly 34 by the focus controller 52 are able to move the lens toward and away from the image detector 36 as needed in order to improve image focus. The clarity or definition of an image on the image detector is evaluated by the number of picture elements or pixels that form one or more edges and lines.

The edges and lines of an image are detected by an edge detector. The edge detector receives information from the image recording device via the camera processor 64.

In one implementation, the controllable lens of the lens assembly 34 is adjusted to place an image in focus. Information regarding the current focus state of the lens assembly is first obtained or provided. The information is, for instance, polled from a camera module formed of functional elements of the camera 30. The camera includes, for instance, an STV 0987 imaging system processor, provided by STMicroelectronics™. Polling is performed, e.g., by reading a sensor register over 12C/SPI at periodic or other selected intervals. Or, the information is pushed from the signal processor as part of, e.g., the frame data or provided on an auxiliary data channel. An MIPI™— defined Camera Serial Interface, CSI-2, provides for virtual and data type channels where the data can be made available at a baseband level. Alternately, in a parallel ITU configuration, data is appended at the end of a frame. For instance, in an implementation using the STV 0987, the information is provided in register OX 5606, and, if desired, a status line is emitted after each frame.

A parameter associated with the fully-focused image is a focus value, FV. A threshold value is derived from the focus value. The threshold value, in the exemplary implementation, is a percentage of the focus value, such as 75 percent of the focus value. The threshold is determinative of whether the image is considered to be mostly-in-focus. Selection of the threshold is made on any of various factors. For instance, selection of the threshold is dependent upon the size of the focus step. When the focus steps are smaller, there are more focus steps from which to choose. Additionally, a near focus has a smaller depth of field.

Once selected, the threshold is determinative of whether the image is, or remains, mostly-in-focus. As long as the focus value remains above the threshold, the image is considered to be mostly-in-focus.

The quantitative evaluation is based upon the following equation:

$$IndValue = IndThreshold + (((Fv - FvThreshold)/(Fv - Peak - FvThreshold)))/4$$

IndValue is the indexed/percentage value;
IndThreshold is the threshold offset to use for near focus, i.e. 0.75 for 75%;
Fv is focus value;
FvThreshold is the threshold based on peak value; and
FvPeak is the peak threshold detected by the AF algorithm.

The divisor of four is a value that is selected based upon the value of the IndThreshold and the type of measure being produced. The range is, e.g., between 0 and 25%.

By way of an example, if the threshold value is selected to be 90% of the focus value, and the focus value is 10000, the threshold focus value is 9000. And, the IndValue, using the above equation, is 87.5%.

The camera processor 64 is coupled to a user interface 68 typically embodied as a liquid crystal display device or LCD. An image on the image detector is thus able to be presented for display on the display device of the user interface 68 at the same time that the image on the image detector 36 is being evaluated and brought into focus.

As set forth above, a problem with prior art camera phones and cameras in general is that a user may desire to take a picture to capture an event or an image, even if the image is slightly out of focus. An indicator can thus be provided when an image on the image detector is at least partially focused, i.e., when the focus controller has finished a coarse focus adjustment and transitions to a fine adjustment mode. Stated another way, a "mostly-in-focus" signal or indicator can be provided when the camera's automatic focus has begun to converge on a fine or optimal focus. The convergence indicator is preferably provided on the user interface display device to signal to a camera user that an image on the display device is sufficiently focused to yield a reasonably good photograph.

Figure 2:
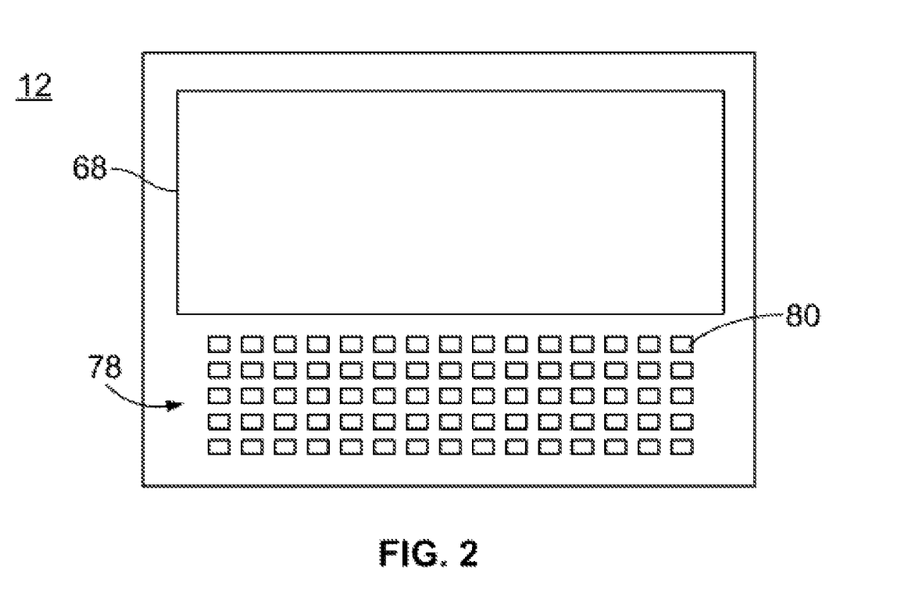
FIG. 2 illustrates an exemplary portable wireless communications device.

FIG. 2 is an elevation view of a portable, wireless communications device 12. The user interface 68 is comprised of a relatively large liquid crystal display device on which images and text can be displayed responsive to signals provided to the user interface 68 from the aforementioned camera processor 64. Push-buttons or keys 78 allow a user to input commands and information. At least one of the push-buttons is a camera actuator button 80, the actuation of which provides a signal to the camera processor 64 to capture an image displayed on the user interface 68, which of course is also the image on the image detector.

Figure 3:
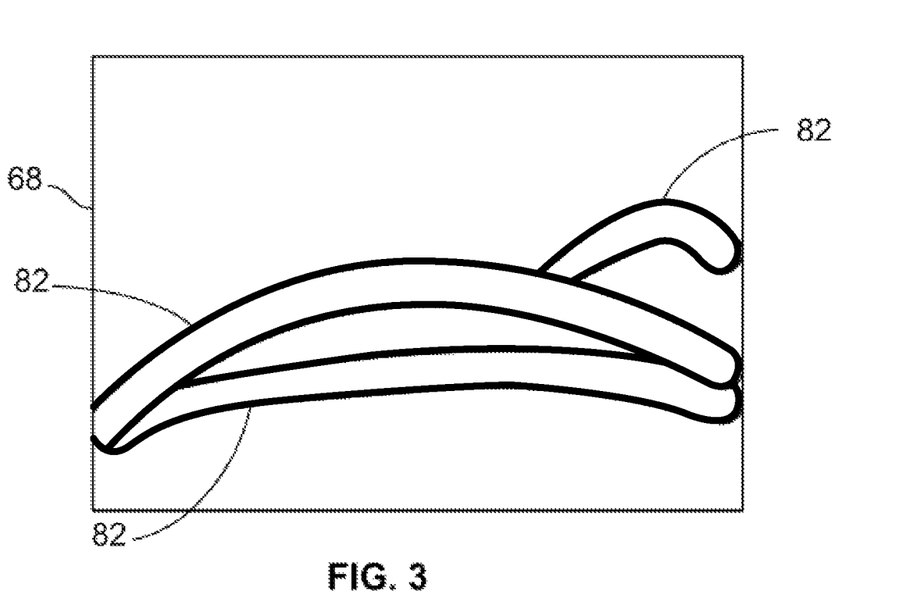
FIG. 3 illustrates an out-of-focus image as displayed on the user interface of a wireless communications device.

FIG. 3 is an isolated view of the liquid crystal display device that comprises the user interface 68. Heavy black lines 82 in FIG. 3 are meant to depict an out-of-focus image of a mountain range. The out-of-focus condition is depicted as lines or edges 82 that are wide and which require several pixels.

Figure 4:
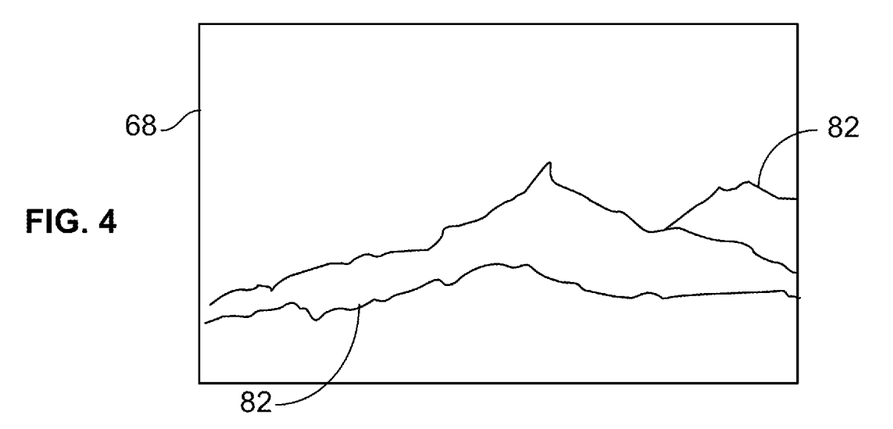
FIG. 4 illustrates an optimally focused version of an image as displayed on the user interface of a wireless communications device.

FIG. 4 is a depiction of the same user interface 68 with the same mountain range brought into focus by the controlled adjustment of the adjustable lens through a coarse and fine adjustment modes. The lines or edges 82 in FIG. 4 are narrow and sharp, corresponding to an optimally-focused image.

Figure 5:
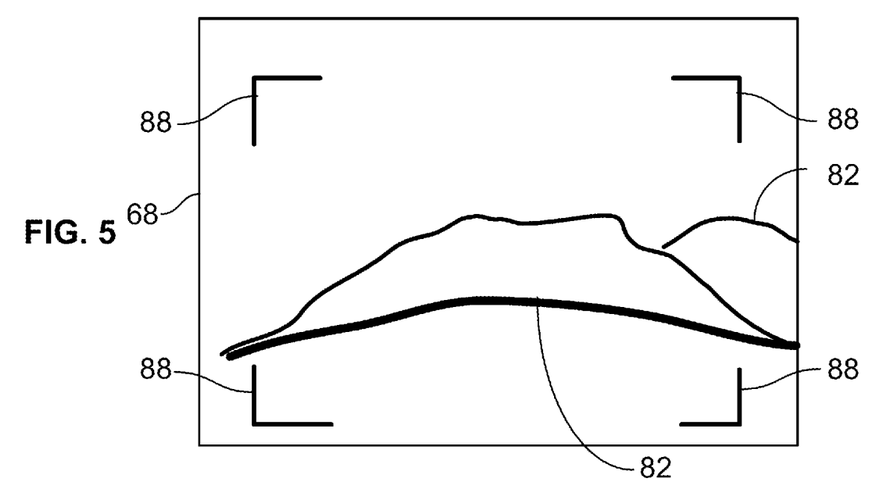
FIG. 5 illustrates a "mostly-in-focus" version of an image and the display of a convergence indicator.

FIG. 5 depicts a "mostly-in-focus" image. The focus or clarity of the image in FIG. 5 is between the out-of-focus state depicted in FIG. 3 and the optimally in-focus state depicted in FIG. 4.

The "mostly-in-focus" state shown in FIG. 5 is considered to exist when the focus controller 52 begins or enters the aforementioned fine-focus mode. The "mostly-in-focus" is enunciated to a camera user by the presentation of an indication of a focus parameter corresponding to the focus of an image when the coarse focus mode can no longer improve image focus. In FIG. 5, the indication of the focus parameter corresponding to "mostly-in-focus" is embodied as a virtual image frame comprised of four L-shaped brackets 88 that are caused to be displayed on the display device 68 by the camera processor 64 proximate to the corners of the display device of the user interface 68. The generation of the focus parameter indicators 88 is effectuated by the camera processor 64 responsive to a comparison of the clarity or line definition on the image detector 36 to a value stored in memory 40.

In one implementation, the user interface 68 displays at least part of the image on the image recording device as well as the indication of the focus parameter. In another implementation, the display of the indication of the focus parameter can be by way of a separate display device such a light emitting diode or array thereof.

As stated above, the adjustable lens assembly 34 is controlled by the focus controller 52 to obtain an optimum focus by initially adjusting the lens assembly 34 in relatively large or coarse steps. Using methodology well-known to those of ordinary skill in the art, the focus controller 52 adjusts the adjustable lens 34 in relatively large steps or increments in order to quickly bring the adjustable lens into at least partial focus as determined by a comparison of lines or other edges to determine whether the image is in focus or out of focus.

Once the image on the image detector 36 is at least partially focused, the focus controller 52 thereafter adjusts the lens 34 in small or fine steps to maximize or optimize image focus. When the focus controller 52 is adjusting the lens assembly 34 in a fine-adjustment mode, the image on the user interface 68 is already sufficiently clear or defined such that the image received thereon is recognizable. When the fine-adjustment mode has been entered, instructions within the processor 64 cause the focus parameter indicator to be displayed on the user interface 68.

As set forth above, in one implementation the focus parameter indicator is comprised of L-shaped corners that form a virtual frame around the displayed image 82. In another implementation, the virtual frame provided by the corners 88 can be provided with one or more different colors to further distinguish the degree to which the image is focused.

Figure 6:
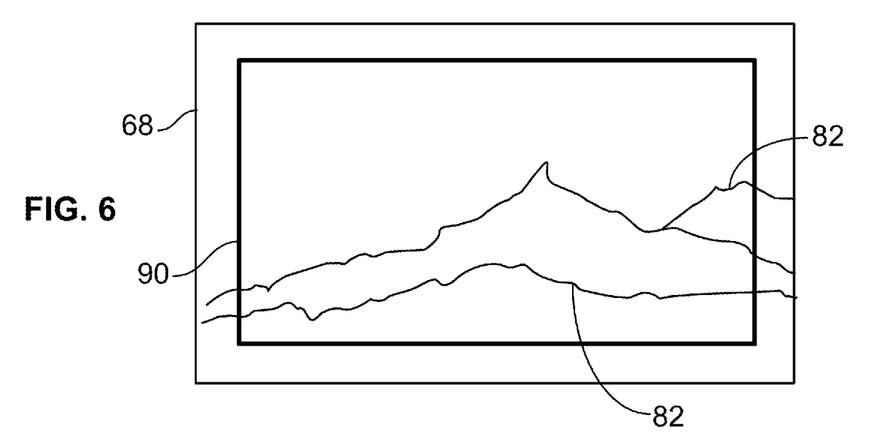
FIG. 6 illustrates an in-focus image with an optimal focus status indicator.

FIG. 6 depicts the image shown in FIGS. 4 and 5 in an in-focus image, similar to that shown in FIG. 4. The rectangle 90 forms an optimal focus status indicator to indicate to a viewer that the image is fully in focus.

Figure 7A:
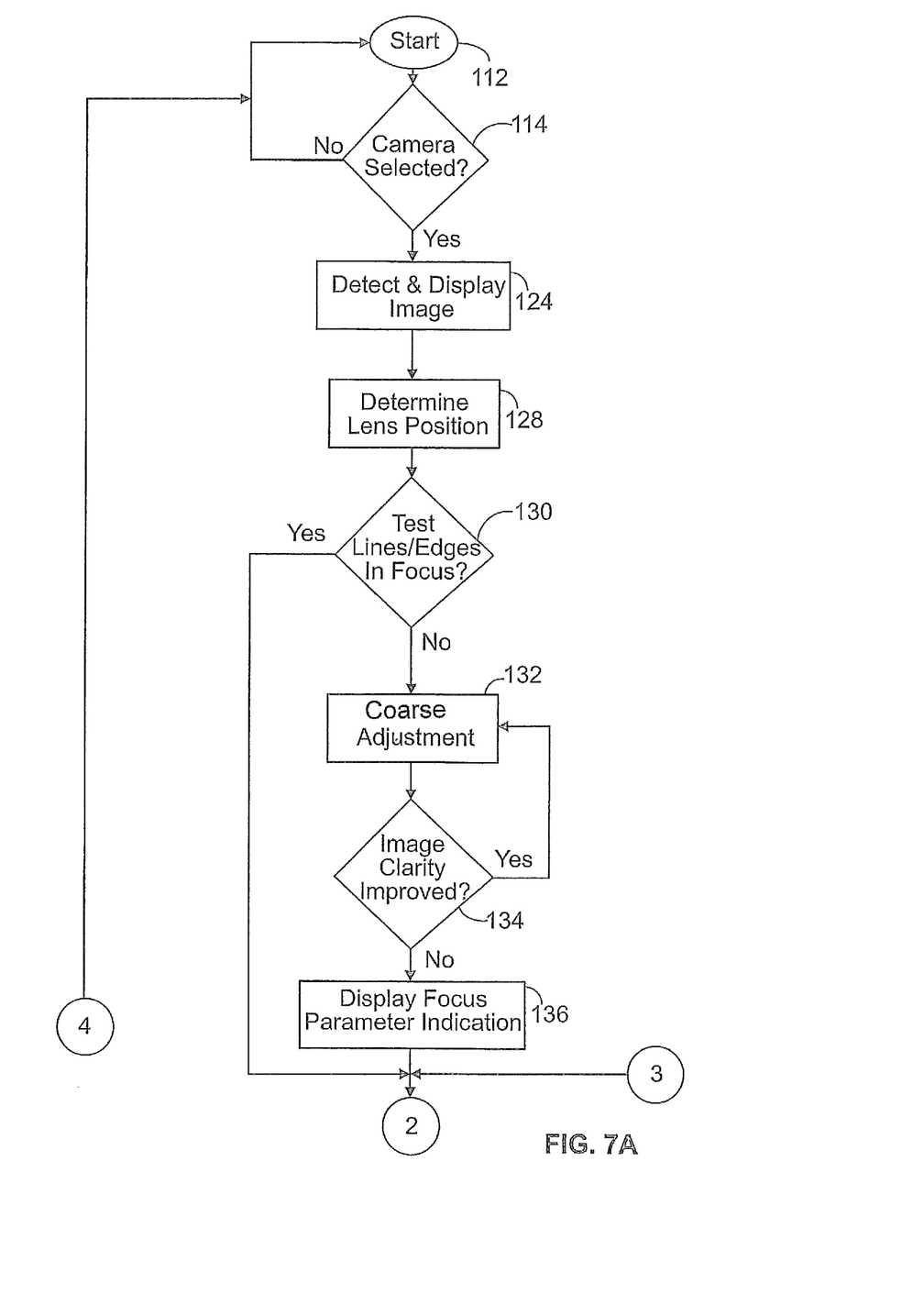
FIGS. 7A and 7B depict a method flow diagram representative of the method of operation of an implementation of the present disclosure.
Figure 7B:
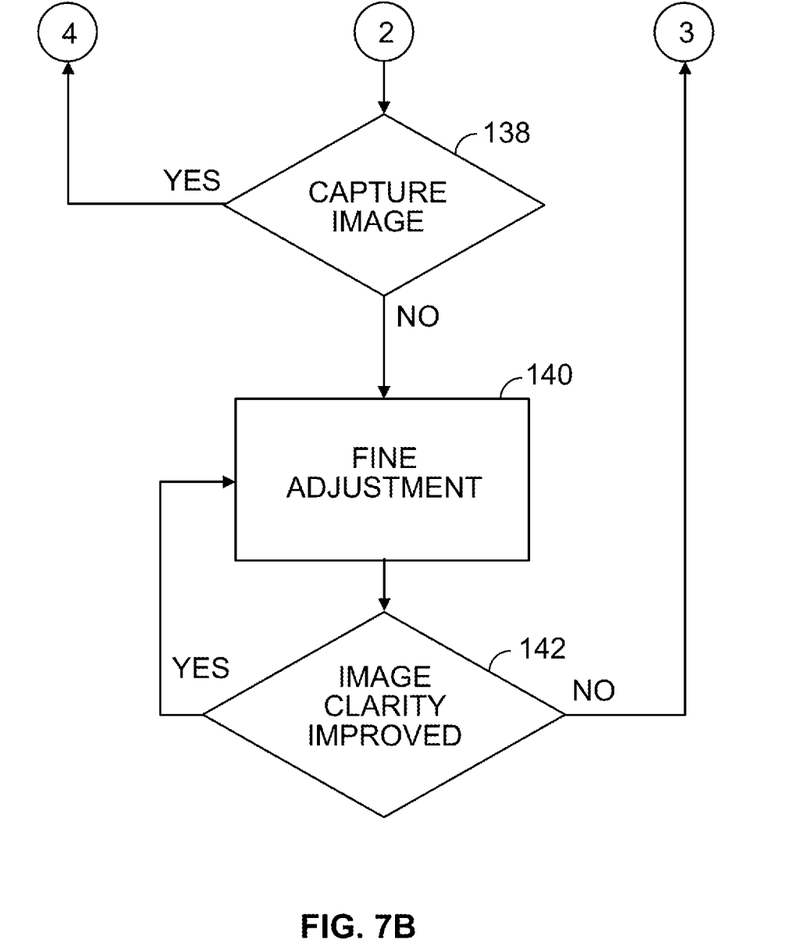

A method of providing a "convergence" indicator is depicted in FIGS. 7A and 7B. Since the wireless communications device 12 provides camera functionality as an option, the method of providing a convergence indicator to show that a displayed image is mostly in focus and ready for capture includes the step of selecting the camera function 114 from the user interface of the communications device 12. At step 124, an image detected on the image detector 36 is displayed on the user interface 68 but also evaluated for the fineness of lines and edges in the detected image. Edge fineness or clarity is evaluated by the presence or absence of pixels or picture elements adjacent to each other which have similar characteristics and the number or width of such adjacent pixels relative to each other.

In step 128, the position of the adjustable lens assembly 34 is determined in order to determine an initial direction of travel. In step 130, the lines and edges of the image on the image detector 36 is evaluated. If it is determined that the image is already in focus, the method proceeds to step 138, where a decision is made whether to capture the image displayed on the user interface 68. If it is determined at step 130 that the image is out of focus, a coarse adjustment is performed at step 132, i.e., a relatively large displacement of the lens is made, followed by a test of whether the image quality improved by the coarse adjustment. If the image quality improved by the coarse adjustment, another coarse adjustment is made to attempt a further improvement. When further image improvement is not realized by a coarse adjustment, the image on the user interface 68 is "mostly in focus." As shown at step 136, a focus parameter indicator, i.e., that the clarity or fineness of the image, is mostly in focus, displayed, preferably on the user interface 68.

From step 136, the method proceeds to step 138, where a decision is made whether to capture the displayed, "mostly-in-focus" image or to proceed to a fine adjustment as shown in steps 140 and 142. If the displayed, "mostly-in-focus" image is captured at step 138, the method returns to step 114. If the decision at step 138 is negative, i.e., the image is not captured, the method continues to attempt to keep the image in focus by repetitively adjusting the fine focus.

FIG. 6 depicts an alternate implementation where achievement of optimum focus is enunciated to a user by the presentation of a solid frame in the user interface 68.

Presently preferred implementations of the disclosure and many of its improvements and advantages have been described with a degree of particularity. The description is of preferred examples of implementing the disclosure and the description of preferred examples is not necessarily intended to limit the scope of the disclosure. The scope of the disclosure is defined by the following claims.

What is claimed is:

1. A method of capturing an image with an electronic camera device having an image detector and an adjustable lens, the method comprising:
    detecting an image on the image detector;
    incrementally changing a separation distance between the adjustable lens and the image detector by a plurality of first-sized steps to improve clarity of the detected image, the incremental changes of the separation distance being made until an additional incremental change by a first-sized step decreases detected image clarity; and
    prior to incrementally changing the separation distance by a plurality of second-sized steps to additionally improve image clarity, displaying an indication that the detected image is ready for capture.

2. The method of claim 1, wherein the first-sized steps are coarse steps and the second-sized steps are fine steps that are smaller than the coarse steps.

3. The method of claim 1, wherein the act of displaying an indication that the detected image is ready for capture is performed before the detected image is optimally focused.

4. The method of claim 1, wherein the act of displaying an indication that the detected image is ready for capture comprises displaying an icon on a display device associated with the electronic camera device.

5. The method of claim 1, wherein the detected image's clarity is evaluated based on a focus-dependent characteristic of the detected image.

6. The method of claim 5, wherein the focus-dependent characteristic is a parameter relating to sharpness of lines forming at least a portion of the detected image.

7. The method of claim 5, wherein the focus-dependent characteristic is a parameter relating to sharpness of edges forming at least a portion of the detected image.

8. The method of claim 1, further comprising displaying the image on a display device associated with the electronic camera device, wherein the act of displaying an indication that the detected image is ready for capture comprises displaying a plurality of L-shaped corners that form a virtual frame around at least a portion of the displayed image.

9. The method of claim 8, wherein the plurality of L-shaped corners are provided with one or more different colors to further distinguish a degree to which the displayed image is focused.

10. The method of claim 8, wherein the virtual frame comprises a rectangular frame.

11. A nonvolatile storage computer-readable medium containing instructions stored thereon which facilitate indication of focus control relative to image capture by an electronic device, when executed by a processor associated with the electronic device, the electronic device including a camera module with an image detector and an adjustable lens, the nonvolatile storage computer-readable medium comprising:
program instructions configured for detecting an image on the image detector;
program instructions configured for determining the detected image's clarity based on evaluating a focus-dependent characteristic of the detected image;
program instructions configured for facilitating incremental changing of a separation distance between the adjustable lens and the image detector by a plurality of first-sized steps to improve clarity of the detected image, the incremental changes of the separation distance being made until an additional incremental change by a first-sized step decreases the detected image's clarity; and
program instructions configured for displaying, prior to incremental changing of the separation distance by a plurality of second-sized steps to additionally improve image clarity, an indication that the detected image is ready for capture.

12. The nonvolatile storage computer-readable medium of claim 11, wherein the program instructions configured for displaying an indication that the detected image is ready for capture comprise program instructions for displaying an icon on a display device associated with the electronic camera device.

13. The nonvolatile storage computer-readable medium of claim 11, further comprising program instructions for evaluating the focus-dependent characteristic of the detected image's clarity based on sharpness of lines forming at least a portion of the detected image.

14. The nonvolatile storage computer-readable medium of claim 11, further comprising program instructions for evaluating the focus-dependent characteristic of the detected image's clarity based on sharpness of edges forming at least a portion of the detected image.

15. The nonvolatile storage computer-readable medium of claim 11, further comprising program instructions for displaying the image on a display device, wherein the program instructions configured for displaying an indication that the detected image is ready for capture comprise program instructions for displaying a plurality of L-shaped corners that form a virtual frame around at least a portion of the displayed image.

16. The nonvolatile storage computer-readable medium of claim 15, wherein the plurality of L-shaped corners are provided with one or more different colors to further distinguish a degree to which the displayed image is focused.

17. An electronic device, comprising:
a camera module including an image detector and an adjustable lens;
a user interface associated with the camera module, the user interface including a display device; and
a controller configured to:
determine a detected image's clarity based on evaluating a focus-dependent characteristic of the detected image;
facilitate incremental changing of a separation distance between the adjustable lens and the image detector by a plurality of first-sized steps to improve clarity of the detected image, the incremental changes of the separation distance being made until an additional incremental change by a first-sized p decreases the detected image's clarity; and
facilitate displaying, prior to incremental changing of the separation distance by a plurality of second-sized steps to additionally improve image clarity, an indication that the detected image is ready for capture.

18. The electronic device of claim 17, wherein the first-sized steps are coarse steps and the second-sized steps are fine steps that are smaller than the coarse steps.

19. The electronic device of claim 17, wherein the indication that the detected image is ready is for capture comprises an icon displayed on the display device.

20. The electronic device of claim 17, wherein the indication that the detected image is ready is for capture comprises a plurality of L-shaped corners that form a virtual frame around at least a portion of the image displayed on the display device.

* * * * *

UNITED STATES PATENT AND TRADEMARK OFFICE
CERTIFICATE OF CORRECTION

PATENT NO. : 9,060,131 B2  Page 1 of 1
APPLICATION NO. : 14/327611
DATED : June 16, 2015
INVENTOR(S) : Brett Foster It is certified that error appears in the above-identified patent and that said Letters Patent is hereby corrected as shown below:

In the claims

In Column 10, Line 34, In Claim 17, delete "p" and insert -- step --, therefor.

In Column 10, Line 44, In Claim 19, after "ready" delete "is".

In Column 10, Line 47, In Claim 20, after "ready" delete "is".

Signed and Sealed this
Fifth Day of January, 2016

Michelle K. Lee
*Director of the United States Patent and Trademark Office*